United States Patent
El Masri et al.

(10) Patent No.: US 8,417,469 B1
(45) Date of Patent: Apr. 9, 2013

(54) FORCE MEASUREMENT

(75) Inventors: Teofilo R. El Masri, Alhambra, CA (US); Bruce L. Inman, Yorba Linda, CA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 12/862,143

(22) Filed: Aug. 24, 2010

(51) Int. Cl.
*G01L 1/00* (2006.01)
*G01C 9/00* (2006.01)
*G06F 19/00* (2011.01)

(52) U.S. Cl.
USPC ............... 702/42; 73/82; 702/41; 702/151

(58) Field of Classification Search ............ 702/41, 702/42, 64, 79, 92, 94, 124, 150, 151; 73/81, 73/82, 597, 644; 250/227.16, 573, 577
See application file for complete search history.

(56) References Cited

U.S. PATENT DOCUMENTS

| 5,197,487 A | * | 3/1993 | Ackerman et al. | ............ 600/589 |
| 6,591,218 B1 | * | 7/2003 | Lysen | ............... 702/151 |
| 2009/0056427 A1 | * | 3/2009 | Hansma et al. | ............ 73/82 |

OTHER PUBLICATIONS

"Digital Force Gauges", Force-Gauge.net, pp. 1-3, retrieved Aug. 25, 2010.
"How Do Gyros Work?",Jul. 31, 2008, pp. 1-7, rchelisite.com/how_do_gyros_work.php.
"23.6. How gyros work", pp. 1-4, retrieved Aug. 25, 2010 swashplate.co.uk/.../ch23s06.html.
Pearson, "How a gyroscope works" pp. 1-4, 1999 http://www.accs.net/users/cefpearson/welcome.htm.
"Dynamics Measurement Unit DM U02", Silicon Sensing, pp. 1-2, retrieved Aug. 25, 2010 sssj.co.jp/en/products/dmu/ .../index.html.
"CG-9230 Evaluation Board with threee digital and three analog inputs", pp. 1-2, Silicon Sensing, retrieved Aug. 25, 2010 sssj.co.jp/en/products/gyro/ .../index.html.
"AZoSensors.com—The A to Z of Sensors", AZoSensorspp. 1-5, retrieved Aug. 25, 2010 http://www.azosensors.com/.
"Chatillon Force Ttesting Equipment", Force-Gauge.net, pp. 1-6, retrieved Aug. 25, 2010 force-gauge.net/chatillon_force_testing...
"Ametek Chatillon Force Gauges and Dynamometers", NEXGEN Ergonomics, pp. 1-2, retrieved Aug. 25, 2010 nextgenergo.com/.../ametekchat1.html.
"Force Gauge—Torque Gauge Product Range", Qualitest, pp. 1-2, retrieved Aug. 25, 2010 www.worldoftest.com/forcetorque.htm.
"Fowler-Wyler Clino 2000 Level", pp. 1-3, retrieved Aug. 25, 2010 http://www.gaging.com/f-zero.htm.
"Inclination and Slope", Integrated Publishing, pp. 1-4, retrieved Aug. 25, 2010 http://www.tpub.com/math2/3.htm.

* cited by examiner

Primary Examiner — John H Le
(74) Attorney, Agent, or Firm — Yee & Associates, P.C.

(57) ABSTRACT

The different advantageous embodiments provide a method and an apparatus for measuring forces. In one advantageous embodiment, an apparatus comprising a probe, a force sensor, an angle measurement system, and an output device is provided. The probe is configured to apply a load to a surface of an object. The force sensor is configured to measure a force along an axis through an end of the probe that contacts the surface when the load is applied to the surface by the probe. The angle measurement system is configured to identify an angle of the axis relative to the surface of the object. The output device is configured to display the force and the angle.

20 Claims, 8 Drawing Sheets

FORCE MEASUREMENT

BACKGROUND INFORMATION

1. Field

The present disclosure relates generally to part testing, and more specifically to measuring forces. Still more particularly, the present disclosure relates to a method and apparatus for measuring forces.

2. Background

Tests are often performed on to determine whether particular properties of the materials are at desired levels. The properties may include, for example, ductility, electrical conductivity, thermal conductivity, fatigue limit, fracture toughness, shear strength, tensile strength, and other suitable properties.

Some tests identifying properties that relate to the durability of the materials used in an object. For example, with aircraft, these objects may take the form of parts for the aircraft. The various parts of an aircraft may be subjected to extreme heat, cold, water, and wind during testing. The tester then confirms that the parts have the desired properties when subjected to the different environmental conditions.

For example, a component, such as a fairing for an aircraft, may be tested for resistance to denting. This test may include subjecting the fairing to a particular force at a particular location on the fairing. The tester may determine whether the fairing meets a specification for the fender by determining whether an inconsistency is present in the fender as a result of the force being applied to the fender.

These tests may be tedious. Often times, different forces may be applied to the fairing in the same location on the fairing. These forces may also be applied to different locations. The setup of the equipment needs to be consistent to obtain accurate results.

Testing parts consistently is important to ensuring the accuracy of the test. In other words, ensuring that each component tested is subjected to the same conditions provides a proper environment from which to draw conclusions about the part being tested.

Therefore, it would be advantageous to have a method and apparatus, which takes into account one or more of the issues discussed above as well as possibly other issues.

SUMMARY

The different advantageous embodiments provide a method and an apparatus for measuring forces. In one advantageous embodiment, an apparatus comprising a probe, a shaft, a force sensor, an angle measurement system, and an output device is provided. The probe is configured to apply a load to a surface of an object. The shaft extends along the axis through the probe. The force sensor is configured to measure a force along the axis through an end of the probe that contacts the surface when the load is applied to the surface by the probe. The angle measurement system is configured to identify an angle of the axis relative to the surface of the object. The output device is configured to display the force and the angle.

In another advantageous embodiment, a method for measuring forces is provided. A load is applied to a surface of an object using probe. The probe is configured to apply the load to the surface of the object. A force along an axis extending through an end of the probe that contacts the surface when the load is applied to the surface by the probe is measured. The force is measured using a force sensor. An angle of the axis is measured relative to the surface of the object using an angle measurement system. A resultant force is generated using the force and the angle. The force and the angle are stored in a storage device. The force and angle stored in the storage device are displayed on a display device.

In another advantageous embodiment, an apparatus comprising a probe, a shaft, a strain gauge, an angular position measurement system, a first potentiometer, a second potentiometer, and a controller is provided. The probe is configured to apply a load to a surface of an object. An end of the probe is configured to contact the surface when the load is applied. A shaft extends along an axis through the probe. The strain gauge is located on the configured to measure a force on the surface along the axis when the load is applied. The angular position measurement system is associated with the probe and is configured to identify a change in an angular position of the probe. The first potentiometer measures a first component of the angle in a first dimension. The second potentiometer measures a second component of the angle in a second dimension. The first dimension is perpendicular to the second dimension. The controller stores a resultant force, the force, the angle, and an amount of time that has elapsed since a specified time in a storage device.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
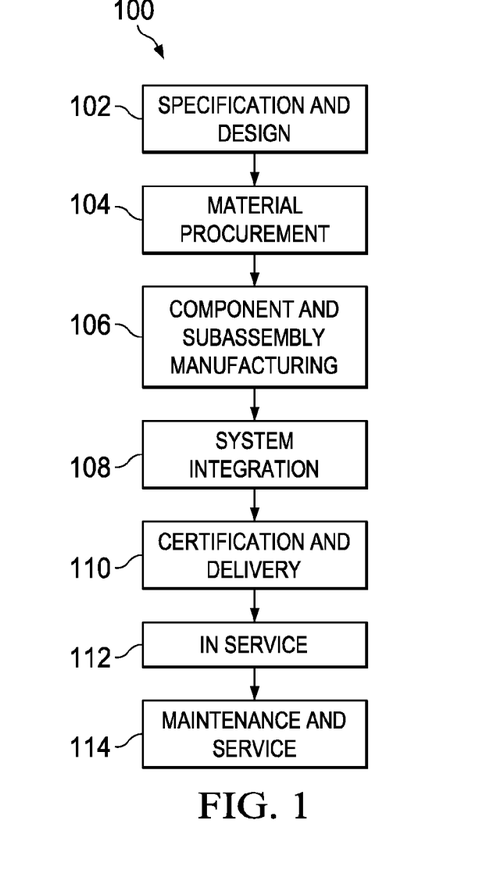
FIG. 1 is an illustration of an aircraft manufacturing and service method depicted in accordance with an advantageous embodiment.
Figure 2:
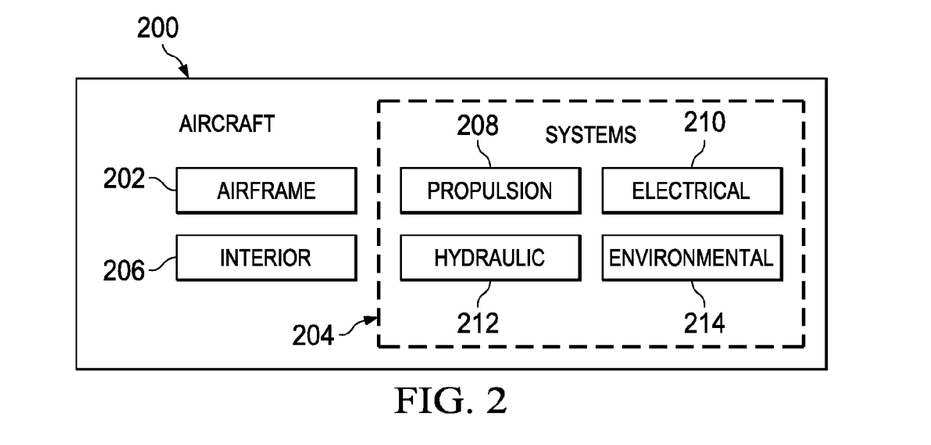
FIG. 2 is an illustration of an aircraft depicted in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200.

For example, advantageous embodiments may be used to manufacture and/or assemble components of aircraft 200. One example of a component of aircraft 200 is airframe 202. During component and subassembly manufacturing 106 and system integration 108, a number of parts for airframe 202 may be tested for durability by applying a force to the parts at particular angles. The parts may then be examined for inconsistencies. The resultant force from the application of a load to the parts through a probe on a tool may be measured and stored for later presentation.

Although the different advantageous embodiments have been described with respect to aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building and/or some other suitable object.

The different advantageous embodiments recognize and take into account a number of different considerations. For example, a part may be tested by being subjected to a force at a particular angle. Such a test may also take place at a changing physical location. For example, a door may be tested for resistance to a force at a one or more different angles throughout the range of movement of the door along the axis on which the hinges operate.

To perform such a test, an operator may position a force gauge at the desired location on the part. The operator may then use a tool to aid in angling the tool to the desired angle. As the test is performed, the operator may record the values for the force applied to the part. The operator attempts to maintain a particular angle of the force gauge throughout the test and while the part is in motion.

The different advantageous embodiments also recognize that parts are frequently tested by applying a force to the part at a particular angle to identify negative effects on the material. The force may be applied at a particular angle relative to the part. For example, the force may be applied at about a 45 degree angle relative to the part.

The different advantageous embodiments recognize that keeping the application of force to the particular angle may be difficult during the testing period. First, an operator may use a protractor to identify the location for the tool that satisfies the desired angle. Additionally, as time elapses, the force applied to the part and the angle at which the tool applies the force may become difficult to maintain because the operator may become fatigued.

In some advantageous embodiments, the part may be moving during the testing period. For example, a test may be performed on a door that is moved about an axis that extends through the hinges for the door. The advantageous embodiments recognized and take into account that, the tool may be difficult to move with the movement of the door while maintaining the desired angle relative to the surface of the door.

The different advantageous embodiments recognize and take into account that recording the force applied to the surface over time, the angle at which the force is applied over time, and the resultant force applied to the surface over time allows an operator to ensure that a test is applied with the same parameters to multiple components. Of course, the parameters may be within a tolerance and may not have exactly the same parameters.

Thus, the different advantageous embodiments provide a method and an apparatus for measuring forces. In one advantageous embodiment, an apparatus comprising a probe, a shaft, a force sensor, an angle measurement system, and an output device is provided. The probe is configured to apply a load to a surface of an object. The shaft extends along the axis through the probe. The force sensor is configured to measure a force along the axis through an end of the probe that contacts the surface when the load is applied to the surface by the probe. The angle measurement system is configured to identify an angle of the axis relative to the surface of the object. The output device is configured to display the force and the angle.

Figure 3:
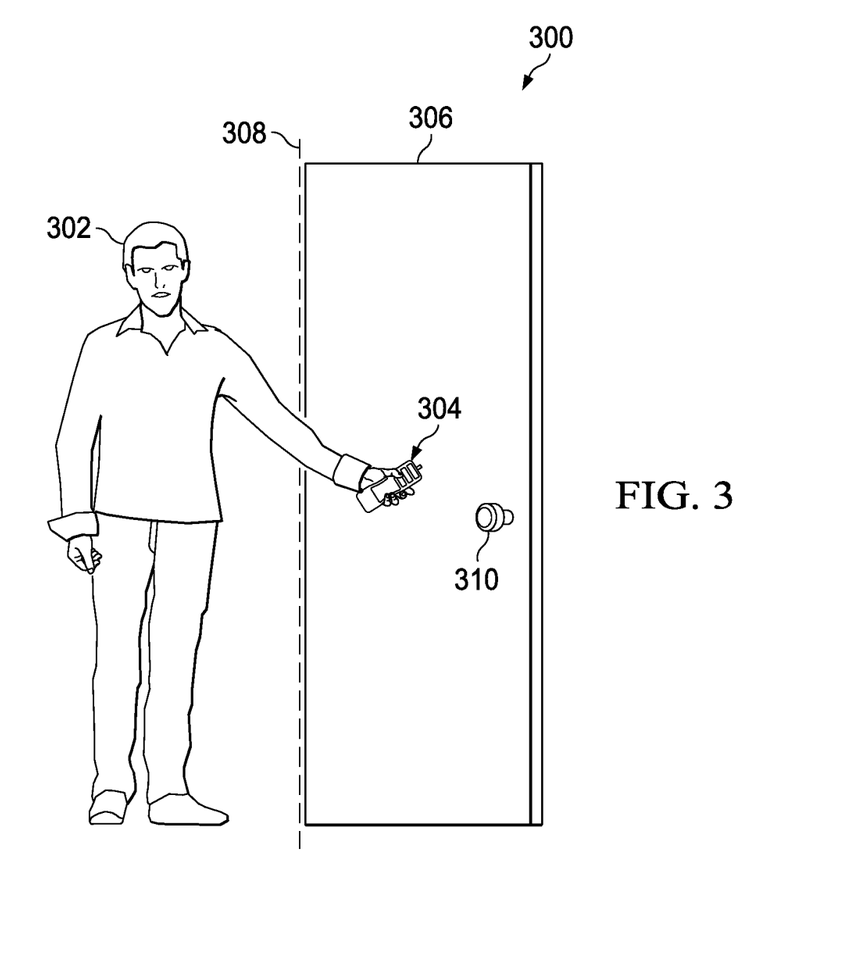
FIG. 3 is an illustration of a force detection environment depicted in accordance with an advantageous embodiment.

Turning now to FIG. 3, an illustration of a force detection environment is depicted in accordance with an advantageous embodiment. Force detection environment 300 may be implemented in component and subassembly manufacturing 106 in FIG. 1. The object tested in force detection environment 300 may be a door, used in aircraft 200 in FIG. 2.

Force detection environment 300 contains operator 302, tool 304, and door 306 in this advantageous embodiment. Operator 302 uses tool 304 to measure a force applied to door 306. In this advantageous embodiment, operator 302 rotates door 306 on axis 308. Axis 308 extends through the hinges for door 306 while maintaining contact between tool 304 and door 306.

In this illustrative example, operator 302 performs a test on door 306 by applying a force to door 306 by positioning tool 304 against door 306. Tool 304 is positioned at a desired angle by changing the angle of tool 304 relative to door 306. In these examples, tool 304 includes a display device. The display device displays the current angle of tool 304 relative to door 306.

Operator 302 then activates tool 304 and applies a force on door 306. Tool 304 monitors the force applied to door 306 for a specified period of time. More specifically, tool 304 monitors the force being applied to door 306, the angle at which tool 304 is positioned relative to door 306, and angular position of tool 304 in space relative to the axis of rotation for the door. Because the force applied to door 306 is at a particular angle relative to door 306, tool 304 generates a resultant force on door 304. A resultant force is an amount of force being applied perpendicular to the surface of door 306. Tool 304 stores the force, the resultant force, the angle, and the position. Tool 304 may also send the force, angle, and angular position to a data processing system for presentation, storage, and/or additional processing. After the specified time period elapses, tool 304 ceases monitoring and storing the force, angle, and position of tool 304.

In some advantageous embodiments, the test performed on door 306 also consists of operating door 306 by rotating door 306 on axis 308 in the direction of arrow 310. Operator 302 continues to apply the force to door 306 at the particular angle using tool 304 while door 306 is in motion. In such advantageous embodiments, tool 304 monitors and stores the change in position of tool 304 over the specified time.

Figure 4:
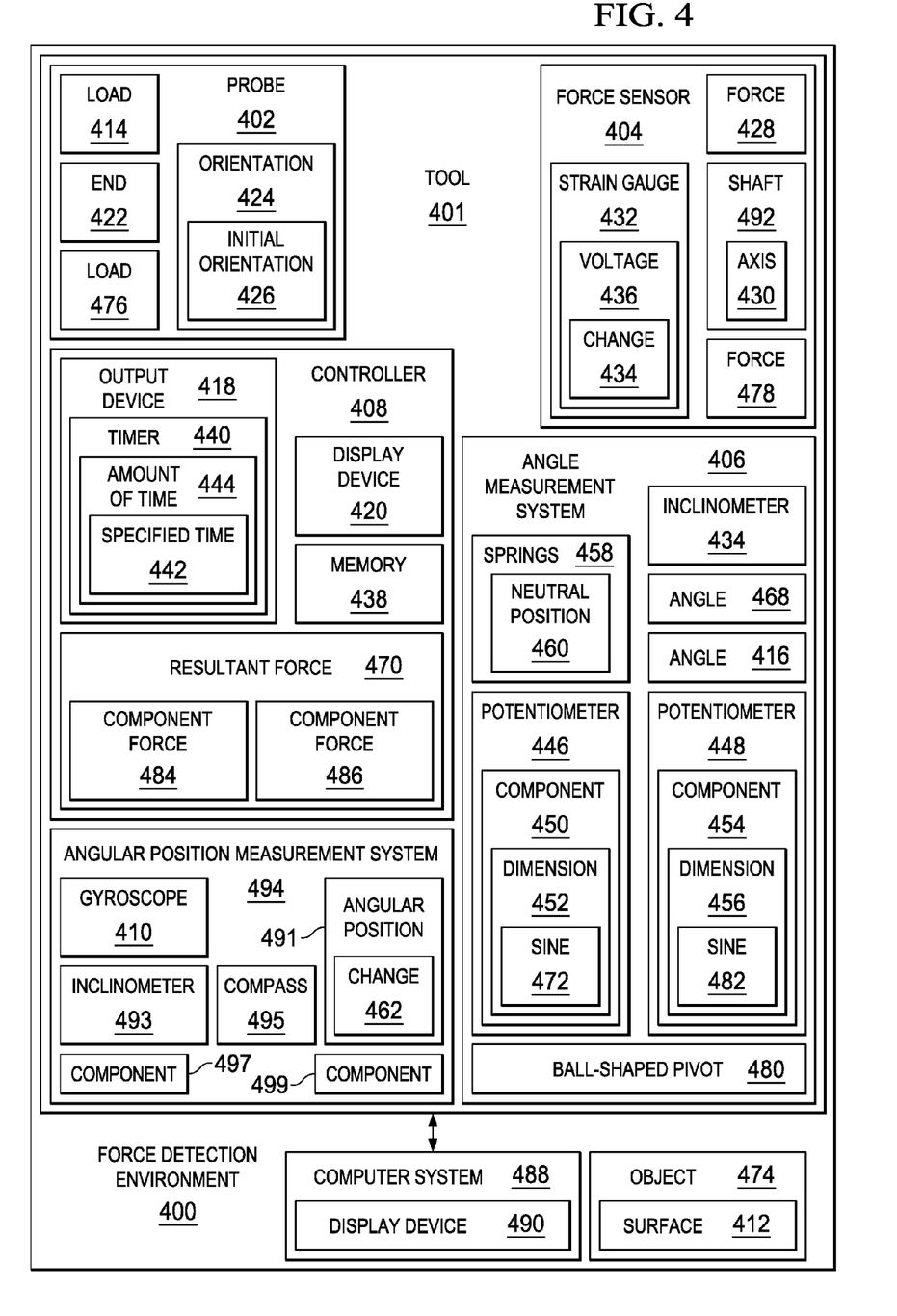
FIG. 4 is an additional illustration of a force detection environment depicted in accordance with an advantageous embodiment.

Turning now to FIG. 4, an illustration of block diagram of a force detection environment is depicted in accordance with an advantageous embodiment. Force detection environment 400 is an environment in which advantageous embodiments may be implemented. Force detection environment 300 in FIG. 3 is an example of one implementation of force detection environment 400.

As depicted, force detection environment 400 contains tool 401 and object 474. Tool 401 is an example implementation of tool 304 in FIG. 3. Tool 401 measures and stores the magnitude of a force applied to surface 412, an angle at which the force is applied, and the position of tool 401 while the force is being applied.

Tool 401 contains probe 402, force sensor 404, angle measurement system 406, controller 408, and angular position measurement system 494. Probe 402 is positioned such that probe 402 contacts surface 412 with end 422 at a desired point on surface. Probe 402 is then oriented to contact surface 412 at initial orientation 426. In these illustrative examples, initial orientation 426 is a desired angle relative to surface 412 for beginning data collection. Initial orientation 426 of tool 401 relative to surface 412 is presented using output device 418. In these examples, tool 401 identifies initial orientation 426 of tool 401 using potentiometer 446 and/or potentiometer 448. In the illustrative examples, potentiometers 446 and 448 are resistors with a sliding contact that forms an adjustable voltage divider. Potentiometers 446 and/or 448 identify initial orientation 426 by identifying electrical resistances being generated by each of potentiometer 446 and potentiometer 448.

Output device 418 consists of display device 420 in some advantageous embodiments. For example, display device 420 may be a liquid crystal display associated with tool 401. Initial orientation 426 is also stored by controller 408 in memory 438 using controller 408 in some advantageous embodiments.

Once probe 402 is positioned to the desired location and orientation 424, an operator applies load 414 to surface 412 along axis 430 using end 422 of probe 402. Axis 430 extends through tool 401 towards end 422 of probe 402. Positioning probe 402 means moving probe 402 to a desired orientation and location. In some advantageous embodiments, controller 408 activates timer 440 in response to applying load 414 to surface 412.

In other advantageous embodiments, an operator actuates a switch or button to activate timer 440. Activating timer 440 generates specified time 442. Specified time 442 is the time at which force sensor 404 begins monitoring force 428. Timer 440 monitors amount of time 444 that has elapsed since a specified time 442. In these examples, amount of time 444 is the time period that has elapsed since testing of surface 412 has begun. Timer 440 may remain active for a particular period of time, or until the operator disables timer 440 by actuating a switch, button, or other suitable input device.

Once timer 440 is activated, force sensor 404 measures force 428 applied to surface 412 by load 414 along axis 430. Force 428 is measured at a particular interval. The particular interval may be specified by the user or may be a default value. In some advantageous embodiments, force sensor 404 consists of strain gauge 432. In the illustrative examples, strain gauge 432 is located on shaft 492. Shaft 492 extends along axis 430 through tool 401. Strain gauge 432 measures force 428 by applying voltage 436 across strain gauge 432. Strain gauge 432 identifies change 434 in voltage 436, where change 434 increases as force 428 increases and decreases as force 428 decreases. Controller 408 stores force 428 in memory 438 using controller 408 and/or presents force 428 using display device 420.

While force sensor 404 measures force 428, angle measurement system 406 measures angle 416. Angle 416 is the angle at which probe 402 contacts surface 412 relative to surface 412. In these examples, angle 416 is measured using potentiometer 446 and potentiometer 448. In the illustrative examples, potentiometers 446 and 448 are resistors with a sliding contact that forms an adjustable voltage divider.

Potentiometers 446 and 448 measure different components of angle 416. In these examples, potentiometer 446 measures component 450 of angle 416. Component 450 of angle 416 is the angle of probe 402 relative to surface 412 in dimension 452. On the other hand, potentiometer 448 measures component 454 of angle 416. Component 454 of angle 416 is the angle of probe 402 relative to surface 412 in dimension 456.

In this advantageous embodiment, dimension 452 is perpendicular to dimension 456. Electrical resistance provided by potentiometers 446 and 448 is changed by the angular movement of probe 402. Angular movement of probe 402 is movement of probe 402 about a point. The movement may be about an axis or multiple axes that intersect the point. Angular movement of probe 402 causes a ball-shaped pivot 480 connected to probe 402 and potentiometers 446 and 448 to change the resistance of the potentiometer measuring the dimension in which probe 402 was moved.

Springs 458 connect angle management system 406 to probe 402. Springs 458 cause probe 402 to return to neutral position 460 when load 414 is not being applied to surface 412.

Tool 401 also consists of angular position measurement system 494. Angular position measurement system 494 measures angular position 491 of tool 401. Angular position 491 is the angle at which tool 401 is located relative to a point in space. For example, object 474 may be a door. In some advantageous embodiments, angular position measurement system 494 measures the angle at which tool 401 is located relative to the point of rotation for the door.

In other advantageous embodiments, angular position measurement system 494 measures angular position 491 by measuring component 497 of angular position 491 and component 499 of angular position 491. In these examples, component 497 is a horizontal dimension and component 499 is a vertical dimension. Thus, angular position measurement system 494 may be used to measure change 462 in angular position 491 while force sensor 404 and angle measurement system 406 are in operation.

In some advantageous embodiments, angle position measurement system 490 consists of gyroscope 410, inclinometer 493, or compass 495. Of course, in other advantageous embodiments, angle position measurement system 490 consists of any combination of gyroscope 410, inclinometer 493, or compass 495. Gyroscope 410 is a rotating mechanism. The mechanism may be a spinning wheel mounted to a frame or other structure that offers resistance to turns in any direction. Gyroscope 410 measures change 462 in angular position 491 of tool 401 while probe 402 applies load 414 to surface 412. Object 474 may be moved while force sensor 404 measures force 428. For example, object 474 may be a door that is rotated on the door hinges during the monitoring of force 428. Gyroscope 410 monitors change 462 in angular position 491 of probe 402 relative to the point of rotation of the door as probe 402 moves with the door such that probe 402 remains in contact with the door.

Likewise, inclinometer 493 and/or compass 495 measure angular position 491 and/or change 462 in angular position 491. Inclinometer 493 is a sensor that identifies the inclination of tool 401 relative to gravity. Compass 495 is a sensor that identifies an orientation of tool 401 relative to magnetic north.

The operator may change the force applied to surface 412 and/or the angle of axis 430 relative to surface 412. In this illustrative example, the operator stops applying load 414 to surface 412 and applies load 476 instead. The operator may also reorient probe 402 to orientation 424. Force sensor 404 then identifies force 466, displays force 466 on display device 420 and/or stores force 478 in memory 438 using controller 408. Additionally, angle measurement system identifies angle 468, displays angle 468 on display device 420, and/or stores force 478 in memory 438 using controller 408.

Each time force 428 or force 466 is received by controller 408, controller 408 generates resultant force 470. Resultant force 470 is the force on surface 412 as a result of load 414 or load 476 being applied to surface 412 by probe 402. Resultant force 470 is generated in these examples by multiplying sine 472 of component 450 by force 428 to form component force 484, multiplying sine 482 of component 454 by force 428 to form component force 486, and adding component force 484 and component force 486 to form resultant force 470.

Measurement of force 428, force 466, angle 416, and angle 468 may be stopped by a user input, such as actuating a button or switch. Alternatively, such measurement may be stopped by the expiration of a period of time. The period of time may be specified by the user or a default value may be used.

In some advantageous embodiments, any combination of resultant force 470, angle 416, amount of time 444, and force 428 are sent to computer system 488. Computer system 488 is a data processing system that may display text and/or graphics on a display using display device 490. Computer system 488 may display one or more graphs of any combination of resultant force 470, angle 416, amount of time 444, and force 428. The graphs may be displayed while tool 401 is applying load 414 to surface 412 or after tool 401 has stopped applying load 414 to surface 412.

The illustration of tool 401 in force detection environment 400 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, resultant force 470 is also displayed on display device 420. Force 428, angle 416, amount of time 444, and resultant force 470 may be displayed using one or more graphs. The graphs may display each of force 428, angle 416, and resultant force 470 as a function of amount of time 444.

Figure 5:
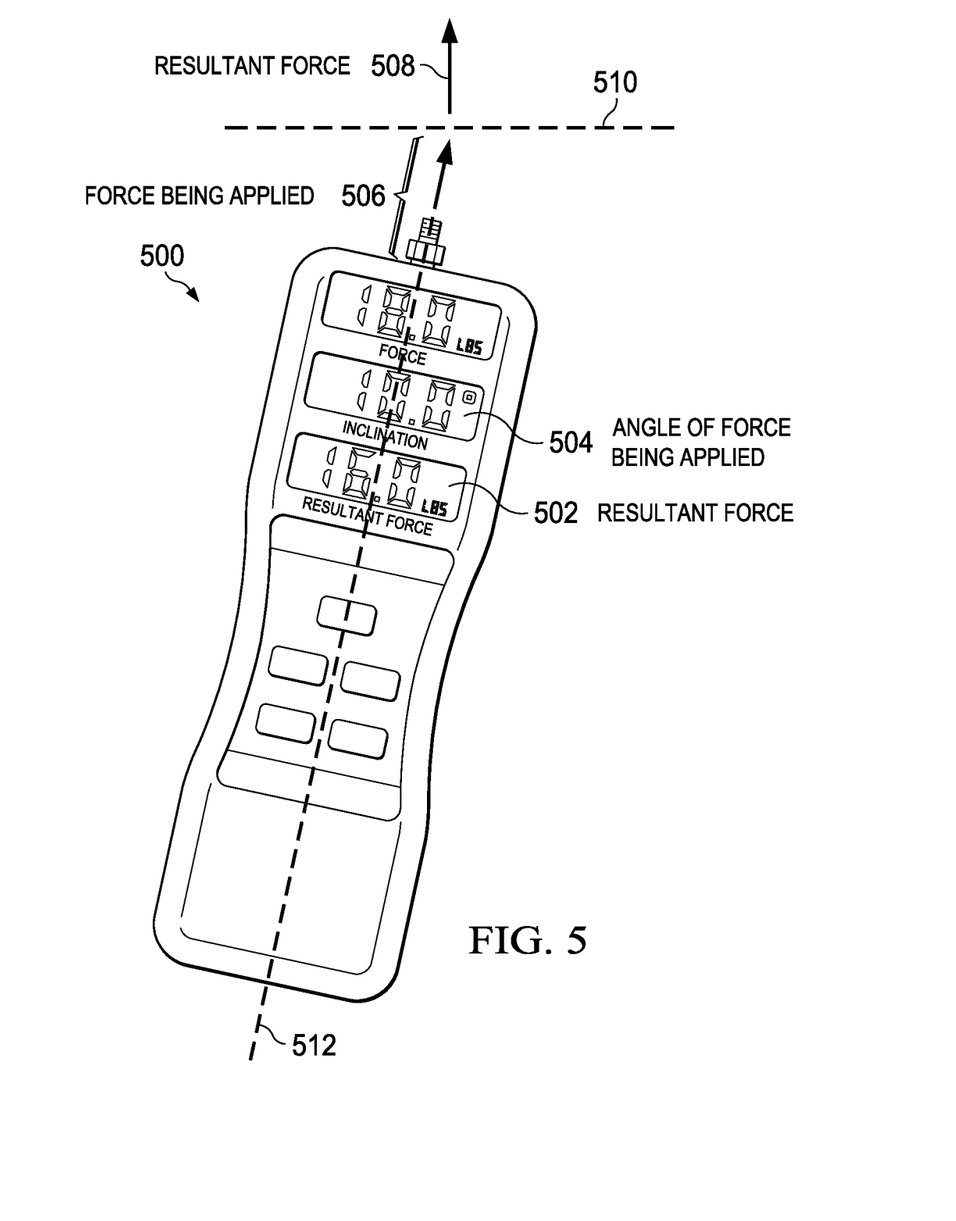
FIG. 5 is an illustration of a tool depicted in accordance with an advantageous embodiment.

Turning now to FIG. 5, an illustration of a tool is depicted in accordance with an advantageous embodiment. Tool 500 is an example implementation of tool 401 in FIG. 4.

Tool 500 measures force experienced by surface 510 as a result of applied force 506 being applied to surface 510. Applied force 506 presented on tool 500 represents the amount of force being applied to surface 510 at angle 504. Angle 504 is the angle at which tool 500 is located relative to surface 510. In this example, angle 504 is 10 degrees.

Resultant force 502 is the amount of force experienced by surface 510 as a result of applied force 506 being applied to surface 510 at angle 504 along axis 512. Axis 512 is an example implementation of axis 430. Arrow 508 represents the direction of resultant force 502 on surface 510. In these examples, resultant force 502 is generated by multiplying the sine of angle 504 by applied force 506.

Figure 6:
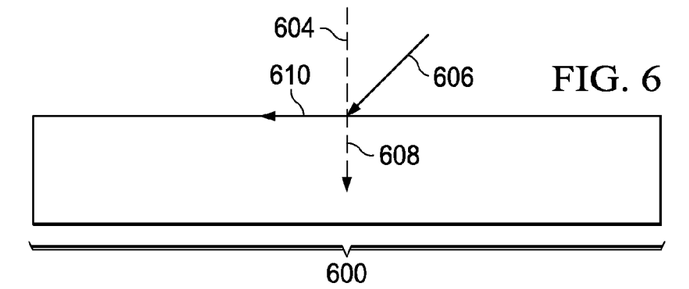
FIG. 6 is an illustration of a surface depicted in accordance with an advantageous embodiment.

Looking now to FIG. 6, an illustration of a surface is depicted in accordance with an advantageous embodiment. Surface 600 is an example implementation of surface 412 in FIG. 4.

Surface 600 is an example of a surface on which a tool, such as tool 401 in FIG. 4, may measure a resultant force and/or angle. Normal 604 is a hypothetical line perpendicular to surface 600.

In this advantageous embodiment, a probe, such as probe 402 in FIG. 4, applies a load to surface 600 at angle 606. In such an advantageous embodiment, potentiometers associated with the probe identify that the load to surface 600 is being applied at angle 606. A force sensor, such as force sensor 404 in FIG. 4, identifies the force being applied to surface 600. The force being applied to surface 600 is being applied at angle 606.

Resultant force on surface 600 is identified. In this advantageous embodiment, the force being applied to surface 600 is divisible into component force 608 and component force 610. The resultant force on surface 600 is component force 608 of the force being applied by the probe at angle 606. Thus, the resultant force on surface 600 is an example implementation of resultant force 470. Component force 610 is a horizontal component of the force being applied at angle 606.

Figure 7:
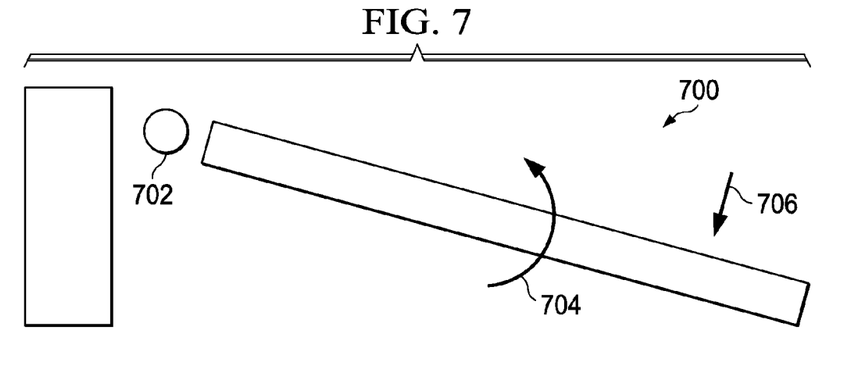
FIG. 7 is another illustration of a surface depicted in accordance with an advantageous embodiment.

Turning now to FIG. 7, another illustration of a surface is depicted in accordance with an advantageous embodiment. Surface 700 is an example implementation of surface 412 in FIG. 4.

In this advantageous embodiment, surface 700 is a door that rotates about axis 702. In this illustrative example, surface 700 is moving in direction 704. As surface moves in direction 704, a tool or a probe, such as probe 402 in FIG. 4, applies force 706 to surface 700. Surface 700 may reduce the speed at which surface 700 rotates in direction 704 as a result of force 706 being applied by the probe.

As the tool associated with the probe identifies force 706, angle, and resultant force being applied to surface 700, the tool also uses an angular position measurement system, such as angular position measurement system 494 in FIG. 4, to identify the change in angular position of the tool. The change in angular position of the tool is measured over the period of time for which the force, angle, and resultant force are being identified.

Figure 8:
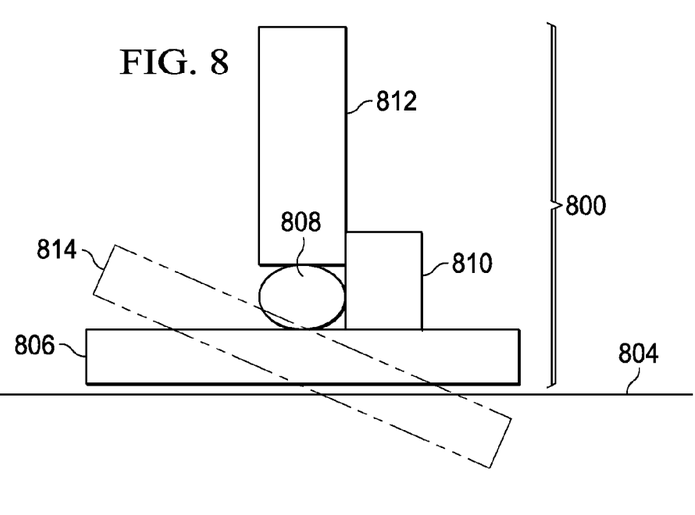
FIG. 8 is an illustration of a tool depicted in accordance with an advantageous embodiment.

Looking now to FIG. 8, an illustration of a tool is depicted in accordance with an advantageous embodiment. Tool 800 is an example implementation of tool 401 in FIG. 4. Tool 800 consists of probe 806, ball pivot 808, potentiometers 810, and shaft 812. Probe 806 is an example implementation of probe 402 in FIG. 4 and contacts surface 804. Ball pivot 808 rotates such that probe 806 may change angle relative to shaft 812 in two dimensions. For example, ball pivot 808 allows probe 806 to rotate to hypothetical position 814.

Potentiometers 810 are example implementations of potentiometers 446 and 448 in FIG. 4. Potentiometers 810 contact probe 806 and change electrical resistance as the angle of probe 806 is changed. Potentiometers 810 consist of two potentiometers in this example, one potentiometer for each dimension in which probe 806 may rotate. Shaft 812 is an example implementation of shaft 492 in FIG. 4.

Figure 9:
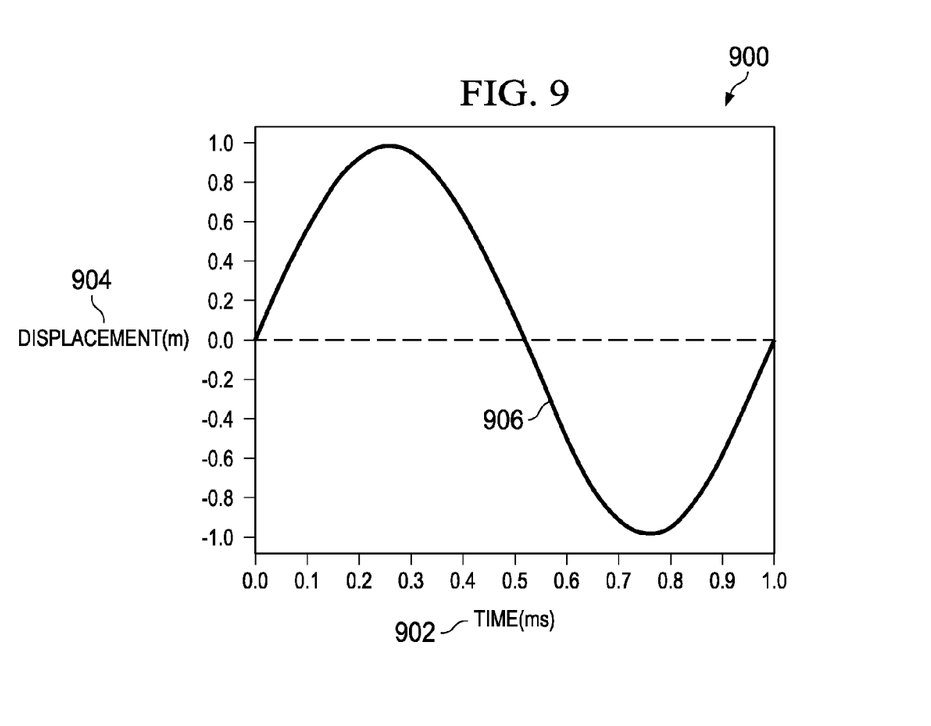
FIG. 9 is an illustration of a graph of resultant force and time depicted in accordance with an advantageous embodiment.

Looking now to FIG. 9, an illustration of a graph of resultant force and time is depicted in accordance with an advantageous embodiment. Graph 900 graphs time 902 and resultant force 904. Graph 900 may be presented on a display device, such as display device 420 in FIG. 4. Time 902 is an example implementation of amount of time 444 in FIG. 4. Resultant force 904 is an example implementation of resultant force 470 in FIG. 4.

Graph 900 plots resultant force 904 as a function of time. Plot 906 is an illustrative example in which resultant force 904 begins at zero, increases until a point in time near the end of the test, and decreases to zero.

Figure 10:
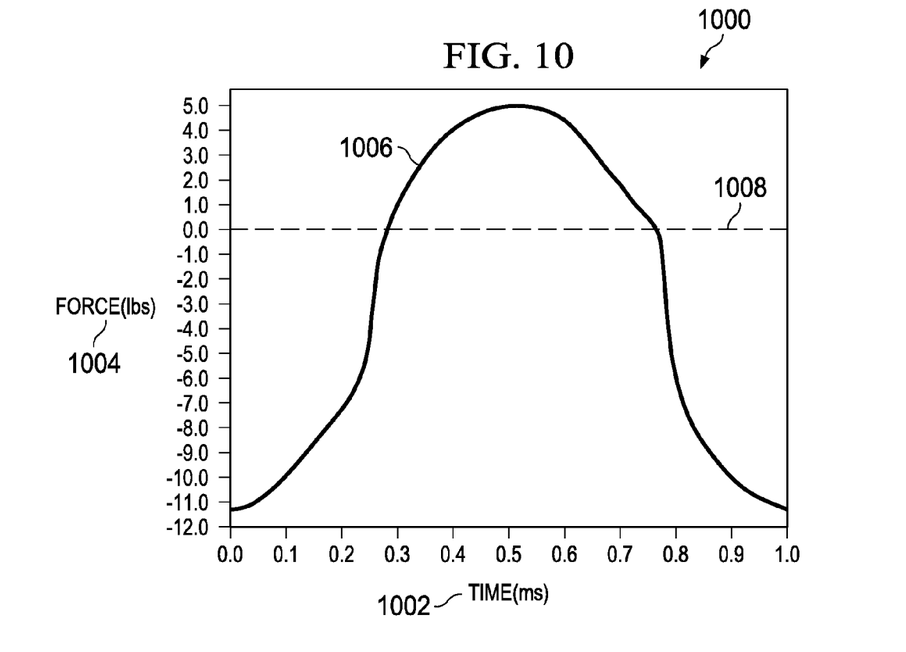
FIG. 10 is an illustration of a graph of angular displacement and time depicted in accordance with an advantageous embodiment.

With specificity to FIG. 10, an illustration of a graph of angular displacement and time is depicted in accordance with an advantageous embodiment. Graph 1000 graphs time 1002 and angular displacement 1004. Graph 1000 may be presented on a display device, such as display device 420 in FIG. 4. Time 1002 is an example implementation of amount of time 444 in FIG. 4. Angular displacement 1004 is an example implementation of angle 416 in FIG. 4.

Graph 1000 plots angular displacement 1004 as a function of time. Plot 1006 is an illustrative example in which angular displacement 1004 begins in the negative, below zero line 1008, increases into positive territory, and then fluctuates between positive and negative territory as time 1002 increases. In this advantageous embodiment, an operator may calibrate the tool such that initial orientation, such as initial orientation 426 in FIG. 4, begins at a selected baseline value. In this example, displacement began below zero at a negative number.

Figure 11:
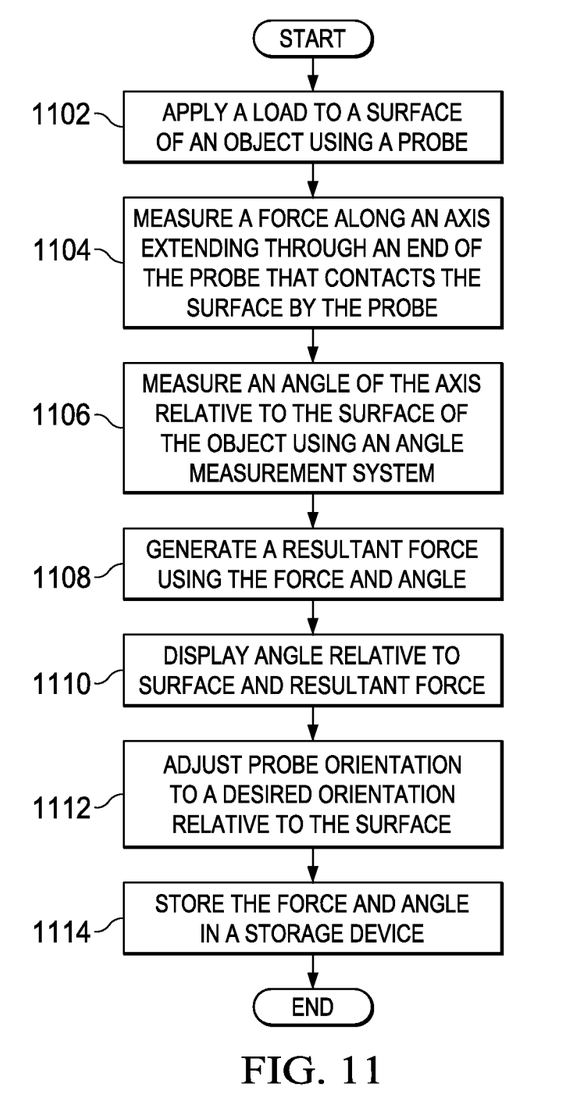
FIG. 11 is a flowchart of a process for detecting forces illustrated in accordance with an advantageous embodiment.

Turning now to FIG. 11, a flowchart of a process for detecting forces is illustrated in accordance with an advantageous embodiment. The process may be implemented by tool 401 in force detection environment 400 in FIG. 4.

The process begins by applying a load to a surface of an object using a probe (operation 1102). The probe is configured to apply the load to the surface of the object. The process then measures a force along an axis extending through an end of the probe that contacts the surface when the load is applied to the surface by the probe, wherein the force is measured using a force sensor (operation 1104). The force may be measured using a strain gauge. The strain gauge may identify a change in voltage across the strain gauge as the force is applied.

The process then measures an angle of the axis relative to the surface of the object using an angle measurement system (operation 1106). The angle between the surface and the axis may be modified while operation 1106 is being performed. The process then generates a resultant force using the force and the angle (operation 1108). The resultant force may be generated by multiplying the sine of the first angular displacement by the first, multiplies the sine of the second angular displacement by the force, and adds the two results to form the resultant force. The process then displays the angle relative to the surface and the resultant surface (operation 1110). The process may display the angle and the resultant force using a display device, such as display device 420 in FIG. 4.

In some advantageous embodiments, the process continues by adjusting probe orientation to a desired orientation relative to the surface (operation 1112). Operation 1112 may be performed by a human operator. Finally, the process stores the force and the angle in a storage device (operation 1114). The process may also present the force and angle on a display device. The process terminates thereafter.

Figure 12:
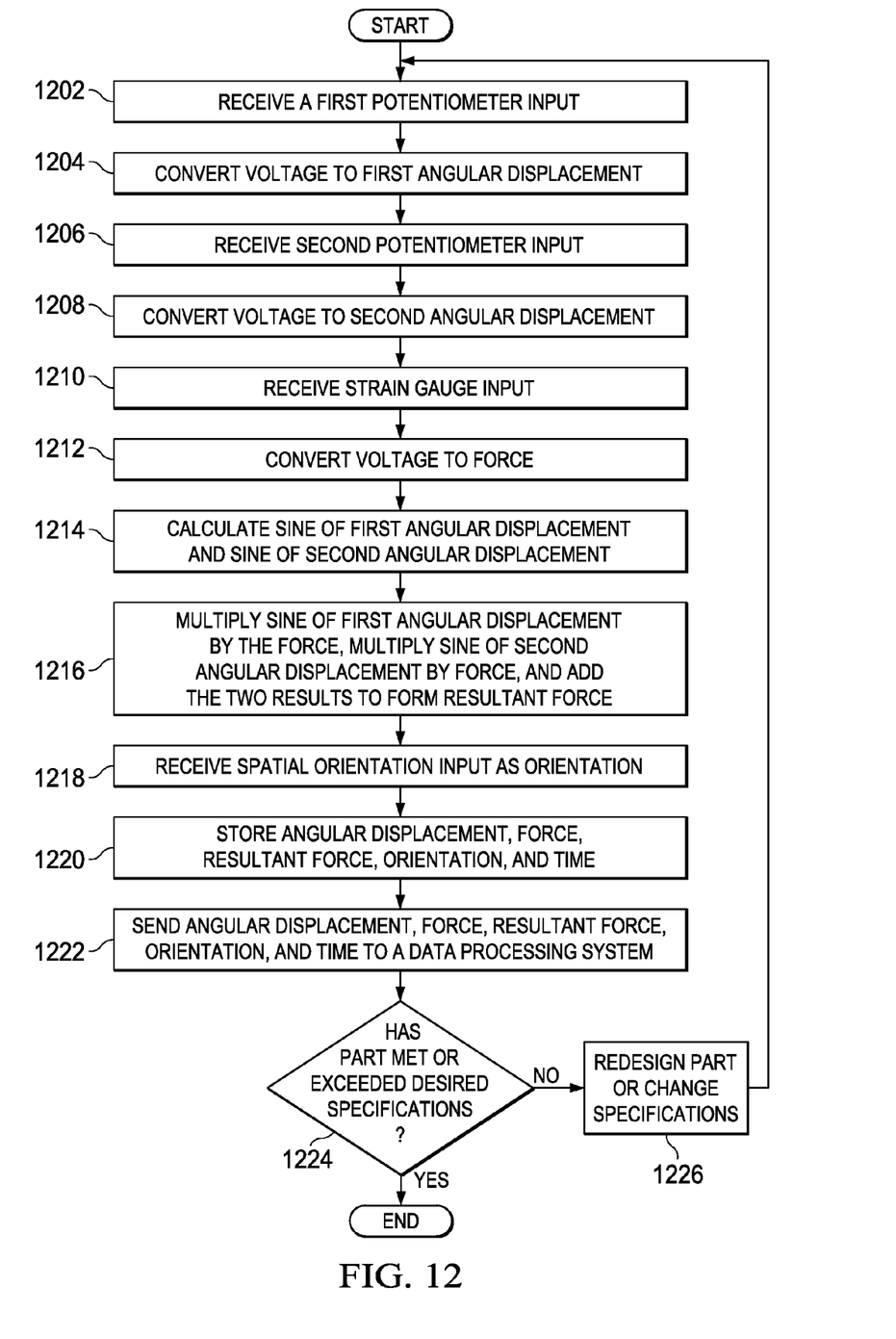
FIG. 12 is an illustration of an additional flowchart for detecting forces depicted in accordance with an advantageous embodiment.

Looking now at FIG. 12, an illustration of an additional flowchart for detecting forces is depicted in accordance with an advantageous embodiment. The process may be implemented by tool 401 in force detection environment 400 in FIG. 4.

The process begins by receiving a first potentiometer input (operation 1202). The first potentiometer is from a first potentiometer that measures a first component of the angle in a first dimension. Potentiometer input may be in the form of changing values of resistance in the potentiometer due to angular movement of the probe. The process then converts voltage to angular displacement (operation 1204).

The process then receives second potentiometer input (operation 1206). The second potentiometer input may be from a second potentiometer that measures a component of the angle in a second dimension perpendicular to the first dimension. The process then converts voltage to a second angular displacement (operation 1208).

The process then receives strain gauge input (operation 1210). Strain gauge input is received based on the change in voltage across the strain gauge. The strain gauge may be located on the end of the probe that contacts the surface. The process then converts the voltage to force (operation 1212).

The process then calculates the sine of angular displacement times the force to form a resultant force (step 1214). The process then multiplies the sine of the first angular displacement by the first, multiplies the sine of the second angular displacement by the force, and adds the two results to form the resultant force (operation 1216).

The process then receives spatial orientation input as orientation (operation 1218). The spatial orientation data may be identified based on movement in the gyroscope on a particular axis. The process then stores the angular displacement, force, resultant force, orientation, and time (operation 1220). The process may store the values in a storage device. The process may also print or present the values.

Next, the process sends the angular displacement, force, resultant force, orientation, and time to a data processing system (operation 1222). The data processing system may be connected by a wired or wireless link. The data processing system may present the angular displacement, force, resultant force, orientation, and time in text or graphical form. The data processing system may also store the angular displacement, force, resultant force, orientation, and time.

The process then determines whether the part has met or exceeded desired specifications (operation 1224). The desired specifications are the specifications being tested by applying the force at the angle. If the process determines that the part has met or exceeded the desired specifications, the process terminates. If the process determines that the part has not met or exceeded the desired specifications at operation 1224, the part is redesigned or the specifications are changed (operation 1226). The part may be redesigned by changing the width height, attachment point, or materials used to build the part. Once the part is redesigned and built or the specifications are changed, the process returns to operation 1202.

The flowchart and block diagrams of the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagram.

For example, operation 1218 in FIG. 12 may be absent in advantageous embodiments in which orientation data is not desired. Additionally, the process may present the force and angle in a graphical user interface in addition to storing the data at operation 1108 in FIG. 11.

Thus, the different advantageous embodiments provide a method and an apparatus for measuring forces. In one advantageous embodiment, an apparatus comprising a probe, a shaft, a force sensor, an angle measurement system, and an output device is provided. The probe is configured to apply a load to a surface of an object. The shaft extends along the axis through the probe. The force sensor is configured to measure a force along the axis through an end of the probe that contacts the surface when the load is applied to the surface by the probe. The angle measurement system is configured to identify an angle of the axis relative to the surface of the object. The output device is configured to display the force and the angle.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a probe configured to apply a load to a surface of an object;
a shaft extending along an axis through the probe;
a force sensor associated with the shaft and configured to measure a force along the axis through an end of the probe that contacts the surface when the load is applied to the surface by the probe;
an angle measurement system configured to measure an angle of the axis relative to the surface of the object;
a controller configured to generate a resultant force using the force and the angle; and
an output device configured to display the force and the angle.

2. The apparatus of claim 1 further comprising:
an angular position measurement system associated with the probe and configured to identify a change in angular position of the probe.

3. The apparatus of claim 2, wherein the angular position system associated with the probe and configured to identify the change in the angular position of the probe is selected from a gyroscope, an inclinometer, and a compass.

4. The apparatus of claim 1, wherein the force sensor configured to measure the force along the axis through the end of the probe that contacts the surface when the load is applied to the surface by the probe comprises:
a strain gauge located on the shaft configured to measure the force along the axis when the load is applied, wherein a voltage is applied across the strain gauge when the probe contacts the surface and the strain gauge identifies a change in the voltage when the force is applied to the probe.

5. The apparatus of claim 1 further comprising:
a timer associated with the output device and configured to identify an amount of time that has elapsed since a specified time.

6. The apparatus of claim 5, wherein the output device stores the resultant force, the force, the angle, and the amount of time in a memory.

7. The apparatus of claim 1, wherein the angle measurement system configured to identify the angle of the axis relative to the surface of the object comprises:

a first potentiometer configured to measure a first component of the angle in a first dimension;

a second potentiometer configured to measure a second component of the angle in a second dimension; and a plurality of springs configured to return the probe to a neutral position when the probe does not contact the surface.

8. The apparatus of claim 7, wherein the controller generates the resultant force applied to the surface by multiplying the force applied to the surface by a first sine of the first component of the angle to form a first component force, multiplying the force applied to the surface by a second sine of the second component of the angle to form a second component force, and adding the first component force and the second component force to form the resultant force.

9. A method for measuring forces comprising:

applying a load to a surface of an object using a probe;

measuring a force using a force sensor, wherein the force is along an axis extending through an end of the probe that contacts the surface when the load is applied to the surface by the probe;

measuring an angle of the axis relative to the surface of the object using an angle measurement system;

generating a resultant force using the force and the angle;

storing the force and the angle in a storage device; and displaying the force and the angle stored in the storage device on a display device.

10. The method of claim 9, wherein the load is a first load, the force is a first force, and the angle is a first angle, and further comprising:

changing the angle of the axis relative to the surface by changing an orientation of the probe;

applying a second load to the surface of the object using the probe;

measuring a second force along the axis extending through the end of the probe that contacts the surface when the second load is applied to the surface by the probe;

measuring a second angle of the axis relative to the surface of the object using the angle measurement system; and storing the second force and the second angle in the storage device.

11. The method of claim 10 further comprising:

identifying an initial orientation of the probe prior to changing the orientation of the probe.

12. The method of claim 10 further comprising:

moving the object and the probe to an angular position such that the probe remains in contact with the surface of the object; and measuring a change in the angular position for the probe resulting from moving the probe.

13. The method of claim 9 further comprising:

measuring an amount of time that has elapsed from a specified time; and storing the amount of time with the force and the angle.

14. The method of claim 9 further comprising:

determining whether the surface of the object meets a desired specification;

responsive to an absence of a determination that the object meets the desired specification, redesigning the object.

15. An apparatus comprising:

a probe configured to apply a load to a surface of an object, wherein an end of the probe is configured to contact the surface when the load is applied;

a shaft extending along an axis through the probe;

a strain gauge located on the shaft and configured to measure a force on the surface along the axis when the load is applied;

an angular position measurement system associated with the probe configured to identify a change in an angular position of the probe;

a first potentiometer configured to measure a first component of an angle in a first dimension;

a second potentiometer configured to measure a second component of the angle in a second dimension, wherein the second dimension is perpendicular to the first dimension; and a controller that stores a resultant force, the force, the angle, and an amount of time that has elapsed since a specified time in a storage device.

16. The apparatus of claim 15, wherein in being configured to identify the change in the angular position of the probe, the angular position measurement system is configured to identify a third component of the angular position in a third dimension and a fourth component of the angular position in the fourth dimension, and the angular position measurement system is selected from a group comprising a gyroscope, an inclinometer, and a compass.

17. The apparatus of claim 15, wherein a voltage is applied across the strain gauge when the probe contacts the surface and the strain gauge identifies a change in the voltage when the force is applied to the probe.

18. The apparatus of claim 15, wherein the controller that stores the resultant force, the force, the angle, and the amount of time that has elapsed since the specified time in the storage device comprises:

a timer associated with the controller and configured to identify the amount of time that has elapsed since the specified time.

19. The apparatus of claim 15 further comprising:

an output device that presents the resultant force applied to the surface of the object at the amount of time that has elapsed since the specified time.

20. The apparatus of claim 15 further comprising:

a data processing system, wherein the controller sends the resultant force, the force, the angle, and the amount of time that has elapsed since the specified time to the data processing system; and a display device associated with the data processing system and configured to display the resultant force, the force, the angle, and the amount of time that has elapsed since the specified time.

* * * * *